United States Patent
Dreisziger et al.

(10) Patent No.: US 9,028,604 B2
(45) Date of Patent: May 12, 2015

(54) METHOD OF REDUCING THE ODOUR OF SULPHUR-BOUND PRODUCTS

(75) Inventors: Gyula Imre Dreisziger, Louvain-laNeuve (BE); Cornelis Pieter Hamelink, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/515,922

(22) PCT Filed: Dec. 5, 2010

(86) PCT No.: PCT/EP2010/069780
§ 371 (c)(1),
(2), (4) Date: Jul. 17, 2012

(87) PCT Pub. No.: WO2011/073266
PCT Pub. Date: Jun. 23, 2011

(65) Prior Publication Data
US 2013/0052150 A1 Feb. 28, 2013

(30) Foreign Application Priority Data
Dec. 15, 2009 (EP) .................................... 09179187

(51) Int. Cl.
*C04B 28/36* (2006.01)
*A61L 9/14* (2006.01)
*C04B 22/06* (2006.01)
*C04B 41/50* (2006.01)
*C04B 111/00* (2006.01)

(52) U.S. Cl.
CPC ............... *C04B 28/36* (2013.01); *C04B 22/068* (2013.01); *C04B 41/50* (2013.01); *C04B 41/5011* (2013.01); *C04B 2111/00017* (2013.01)

(58) Field of Classification Search
CPC .............................. C04B 28/36; C04B 22/068
USPC ....................... 106/287.32, 503; 423/473, 584
See application file for complete search history.

(56) References Cited

U.S. PATENT DOCUMENTS

| | | | | |
|---|---|---|---|---|
| 3,544,543 A | 12/1970 | Greco et al. | | 260/125 |
| 3,676,166 A | 7/1972 | Louthan | | 106/241 |
| 3,974,117 A * | 8/1976 | Illmann et al. | | 524/824 |
| 4,308,072 A | 12/1981 | Schneider et al. | | 106/287 |
| 5,861,096 A * | 1/1999 | Mason et al. | | 210/631 |
| 2005/0115895 A1 * | 6/2005 | Simpson et al. | | 210/610 |
| 2007/0186823 A1 | 8/2007 | Van Trier et al. | | 106/806 |

FOREIGN PATENT DOCUMENTS

| | | | | |
|---|---|---|---|---|
| DE | 284217 | 11/1990 | | C04B 28/36 |
| WO | WO2005059016 | 6/2005 | | C08K 28/36 |
| WO | WO2006134130 | 12/2006 | | C04B 28/36 |
| WO | WO2007065920 | 6/2007 | | C04B 28/36 |
| WO | WO2008148804 | 12/2008 | | C04B 14/06 |
| WO | WO2008148814 | 12/2008 | | C01B 17/02 |

OTHER PUBLICATIONS

Vantassel, Stephen. Removing Skunk Odor. Jun. 2005. Universiy of Nebraska-Lincoln. p. 1-2.*
Hamner, Shannon. Hydrogen Peroxide and It's Many Uses. Apr. 20, 2009.*
Using Hydrogen Peroxide. Aug. 29, 2007.*
Currell, B.R., et al; "Plasticization of Sulfur"; Proceedings of Symposium "New Uses of Sulphur"; Advances in Chemistry Series No. 140, Am. Chem. Soc.; pp. 1-17; Apr. 1975.

* cited by examiner

Primary Examiner — Frederick Krass
Assistant Examiner — Tracy Liu
(74) Attorney, Agent, or Firm — Charles W. Stewart

(57) ABSTRACT

Method of reducing the odor of sulphur-bound products, in particular modified sulphur or sulphur concrete, comprising contacting the sulphur-bound products with a bleaching agent, like e.g. sodium hydrochloride or hydrogen peroxide. The resulting sulphur-bound products emit reduced levels of sulphur-containing gases such as $H_2S$ and $SO_2$ and have a reduced odor.

18 Claims, No Drawings

METHOD OF REDUCING THE ODOUR OF SULPHUR-BOUND PRODUCTS

PRIORITY CLAIM

The present application claims priority from PCT/EP2010/069780, filed 15 Dec. 2010, which claims priority from EP 09179187.1, filed 15 Dec. 2009.

FIELD OF THE INVENTION

The present invention relates to a method of reducing the odour of sulphur-bound products, in particular modified sulphur and sulphur concrete.

BACKGROUND OF THE INVENTION

Articles such as preformed concrete building blocks, roof and floor tiles, paving slabs, structural members, and other articles have traditionally been formed from concrete comprising a mixture of cement, such as hydraulic or Portland cement, mineral aggregate, and water, plus various optional additives such as air entraining agents, water reducers, plasticizers, water proofing and possibly others. These materials may in some instances be combined with reinforcement such as steel bars, wires or fibres. The materials are generally blended in a concrete mixer and the resultant wet mixture is placed and densified in a mould or form to produce a desired shape. Hydration of the cement paste then takes place over a period of time after which the mould or form is removed to form the concrete article. Concrete formed in this manner has reasonable strength and durability in most environments.

Sulphur is readily available in many countries as a by-product of the oil and gas industry. The relatively low cost and unique properties of sulphur have led to its utilization as a construction material particularly to replace the use of Portland cement or asphalt cement. Sulphur concretes have been developed in which elemental or modified sulphur completely replaces the Portland cement as binder.

The sulphur used in such products is typically modified or plasticised in order to prevent allotropic transformation of the solid sulphur. Modified sulphur is typically prepared by reacting a portion of the sulphur with a sulphur modifier, also referred to as sulphur plasticiser. A well-known category of sulphur modifiers are olefinic compounds that co-polymerise with sulphur. Known examples of such olefinic modifiers are dicyclopentadiene, limonene, styrene or naphthalene. Reference is for example made to B. R. Currell et al. "Plasticization of Sulfur" In: J. R. West (ed.), Preeceedings of symposium "New Uses of sulphur", Los Angeles, April 1974, Advances in Chemistry Series No. 140, Am. Chem. Soc., Washington, 1975, p. 1-17. Other examples of olefinic modifiers are 5-ethylidene-2-norbornene and 5-vinyl-2-norbornene as described in WO2006/134130.

Plasticised or modified sulphur may be used in the form of a so-called concentrate, i.e. sulphur reacted with a relatively high amount of modifier. For the preparation of the sulphur-bound product, e.g. concrete, the concentrate is then mixed at a temperature above the melting temperature of sulphur with further sulphur, filler and aggregate, and solidified.

Unfortunately, sulphur-bound products such as modified sulphur and sulphur concrete tend to suffer from the disadvantage of having an undesirable odour. This is due to the emission of sulphur-containing gases such as $H_2S$, $SO_2$ and mercaptans (such as methyl mercaptan and ethyl mercaptan) from both modified sulphur and sulphur concrete during and after manufacture. This odour is particularly undesirable in the case of sulphur concrete if it is to be used in any setting where people come into contact with it, e.g. paving slabs, tiles, walls etc. Therefore there is a need for providing modified sulphur and sulphur concrete having a reduced odour.

It has now surprisingly been found by the present inventors that if sulphur-bound products, such as modified sulphur or sulphur concrete, are contacted with a suitable bleaching agent the odour of these products is reduced.

SUMMARY OF THE INVENTION

According to one aspect of the present invention there is provided a method of reducing the odour of sulphur-bound products, in particular modified sulphur and sulphur concrete, comprising contacting the sulphur-bound products with a bleaching agent.

According to another aspect of the present invention there is provided a process for preparing a modified sulphur having a reduced odour comprising the steps of (i) admixing molten sulphur with one or more sulphur modifiers to produce a modified sulphur and (ii) contacting the modified sulphur with a bleaching agent.

According to a further aspect of the present invention there is provided a modified sulphur wherein the level of $H_2S$ emitted by the modified sulphur is less than 2 ppm.

According to a further aspect of the present invention, there is provided a process for making a shaped sulphur concrete article comprising (a) admixing sulphur cement and aggregate at a temperature at which sulphur is liquid to form a molten sulphur concrete product (b) forming the molten sulphur concrete product into a shaped sulphur concrete article; (c) solidifying the shaped sulphur concrete article; and (d) bringing the shaped sulphur concrete article into contact with a bleaching agent.

According to a further aspect of the present invention there is provided a sulphur concrete article wherein the level of $H_2S$ emitted by the sulphur concrete article is less than 2 ppm.

According to yet a further aspect of the present invention there is provided the use of a bleaching agent for reducing the odour of sulphur-bound products, in particular sulphur modifier and sulphur concrete.

DETAILED DESCRIPTION OF THE INVENTION

As used herein the term "sulphur-bound products" means products which contain either sulphur or modified sulphur as a binder.

As used herein the term "modified sulphur" means sulphur which has been modified or plasticized in order to prevent allotropic transformation of the solid sulphur.

As used herein the term "sulphur cement" means a composition comprising sulphur or modified sulphur and a filler.

As used herein the term "sulphur concrete" means a composite comprising both sulphur cement and aggregate.

Modified sulphur may be prepared by admixing molten sulphur with a suitable sulphur modifier.

There is no particular limitation on the type of sulphur modifier which can be used herein. A well-known category of sulphur modifiers are olefinic compounds that co-polymerise with sulphur such as dicyclopentadiene, limonene, styrene, naphthalene, 5-ethylidene-2-norbornene (ENB) and 5-vinyl-2-norbornene (VNB). Preferred sulphur modifiers for use herein are selected from styrene, 5-ethylidene-2-norbornene and 5-vinyl-2-norbornene, especially 5-ethylidene-2-norbornene and 5-vinyl-2-norbornene.

Preparation of modified sulphur is known in the art and is described for example in WO2006/134130, incorporated herein by reference.

As mentioned above, modified sulphur suffers from the disadvantage that it tends to have an undesirable odour due to emission of sulphur-containing gases such as $H_2S$, $SO_2$ and mercaptans during and after manufacture. According to the present invention there is provided a method of reducing the odour of modified sulphur comprising contacting the modified sulphur with a bleaching agent.

According to another aspect of the present invention there is provided a method for preparing a modified sulphur having a reduced odour comprising the steps of (i) admixing molten sulphur with one or more sulphur modifiers to produce a modified sulphur and (ii) contacting the modified sulphur with a bleaching agent.

Suitable bleaching agents for use herein include sodium hypochlorite, sodium hypobromite, calcium hypochlorite, calcium hypobromite, sodium hypoiodite, calcium hypoiodite, hydrogen peroxide, and mixtures thereof.

Preferred bleaching agents for use herein are sodium hypochlorite and hydrogen peroxide.

While not wishing to be bound by theory it is believed that the sodium hypochlorite (NaOCl) oxidizes the $H_2S$ according to the following reaction:

$$H_2S + 4NaOCl \rightarrow H_2SO_4 + 4NaCl$$

When hydrogen peroxide is used as the bleaching agent it is believed that the hydrogen peroxide oxidizes the $H_2S$ to sulphur according to the following reaction:

$$H_2S + H_2O_2 \rightarrow S + 2H_2O$$

There are various methods of bringing the modified sulphur into contact with the bleaching agent. In one embodiment of the present invention the modified sulphur is sprayed with an aqueous solution of bleaching agent. In another embodiment of the present invention the modified sulphur is wiped with an implement, such as a cloth or a roller, which has been soaked in an aqueous solution of bleaching agent. In the spraying and wiping methods mentioned above it may not be necessary to spray or wipe the whole surface area of the modified sulphur. It may be sufficient to spray or wipe part of the surface area of the modified sulphur in order to reduce the odour of the modified sulphur. For example, if the modified sulphur is in the form of a tablet, it may be sufficient to wipe only one or two faces of the tablet. Another suitable method is to submerge the modified sulphur in an aqueous solution of bleaching agent, preferably for a time period in the range of from 0.5 hours to 48 hours, more preferably in the range of from 0.5 hours to 24 hours, even more preferably in the range of from 0.5 hours to 12 hours.

It is preferred that the bleaching agent is present in the aqueous solution at a level in the range of from 0.01% to 20%, more preferably from 0.05% to 10%, even more preferably from 0.1% to 6% by weight of the aqueous solution.

The modified sulphur according to the present invention has a reduced odour due to the reduction of sulphur-containing gases being emitted from the modified sulphur.

The modified sulphur having a reduced odour according to the present invention is particularly suitable for use in products comprising modified sulphur as a binder. Examples of such sulphur-bound products are sulphur cement and sulphur cement-aggregate composites such as sulphur mortar and sulphur concrete.

The modified sulphur of the present invention can be admixed with a filler and/or aggregate and optionally further elemental sulphur to produce the desired sulphur-bound products, e.g. sulphur cement and sulphur concrete.

Sulphur cement is known in the art and typically comprises either elemental or modified sulphur, typically modified sulphur in an amount of at least 50 wt %, and a filler. Suitable sulphur modifiers for use in sulphur cement are those sulphur modifiers described above in relation to modified sulphur, incorporated in an amount of from 0.1 to 10% by weight based on the weight of sulphur.

The sulphur cement preferably comprises from 8% to 90% by weight of sulphur, more preferably from 10% to 60% by weight of sulphur, even more preferably from 10% to 30% by weight of sulphur.

Usual sulphur cement fillers are particulate inorganic material with an average particle size in the range of from 0.1 µm to 0.1 mm. Examples of such sulphur cement fillers are silica, fly ash, limestone, quartz, iron oxide, alumina, titania, graphite, gypsum, talc, mica or combinations thereof. The filler content of sulphur cement may vary widely, but is typically in the range of from 5 to 50 wt %, based on the total weight of the cement.

Sulphur cement-aggregate composites are composites comprising both sulphur cement and aggregate. Examples of sulphur cement-aggregate composites are sulphur mortar and sulphur concrete. Mortar comprises fine aggregate, typically with particles having an average diameter between 0.1 and 5 mm, for example sand. Concrete comprises coarse aggregate, typically with particles having an average diameter between 5 and 40 mm, for example gravel or rock. It will be evident to a person skilled in the art that reference herein to sulphur concrete may also include sulphur mortar if the aggregate is fine aggregate only.

It has also been found by the present inventors that the method described above to reduce the odour of modified sulphur can also be used to reduce the odour of sulphur concrete. Hence, according to a further aspect of the present invention there is provided a method of reducing the odour of sulphur concrete comprising contacting the sulphur concrete with a bleaching agent. Suitable bleaching agents for use in such a method are the same as those mentioned above for reducing the odour of modified sulphur.

There are no particular limitations as to the type of sulphur concrete which can be used in the method herein. Examples of sulphur concrete and their methods of manufacture can be found in WO2007/065920, WO2008/148804, WO2008/148814 and US2007/0186823, incorporated herein by reference.

Another preferred component of the sulphur concrete, in addition to those described above, is wax. The wax is preferably a paraffin wax, more preferably a paraffin wax resulting from a Fischer-Tropsch process. Preferably the paraffin wax comprises at least 90% by weight of straight chain alkanes. Preferably the alkane chain length is from C30 to about C100. Preferably the melting point of the wax is from 70 to 120° C. The wax may also be a slack wax. Slack wax is a crude wax produced by chilling and solvent filter-pressing wax distillate in refinery operations.

The amount of wax in the sulphur concrete is preferably in the range of from 0.05 to 2%, more preferably in the range of from 0.25 to 1.5%, even more preferably in the range of from 0.4 to 1%, by weight of the sulphur cement.

The sulphur concrete may also comprise a coupling agent that improves the interaction between the sulphur and the filler and aggregate. Known coupling agents include organosilanes and organotitanates e.g. as described in WO2007/065920, WO2008/148804 and WO2008/152054. A preferred coupling agent for use herein is a bis(triethoxysilylpropyl)

tetrasulphide (TESPT) coupling agent as described in WO2007/065920, WO2008/148804, WO2008/148814 and US2007/0186823. The amount of coupling agent is preferably in the range of from 0.1 to 1.5%, by weight of the sulphur.

There are various methods of bringing the sulphur concrete into contact with a bleaching agent. In one embodiment of the present invention the sulphur concrete is sprayed with an aqueous solution of bleaching agent. In another embodiment of the present invention the sulphur concrete is wiped with a cloth which has been soaked in an aqueous solution of bleaching agent. For example, in the case of a floor made out of sulphur concrete, the floor can be wiped or sprayed with an aqueous solution of bleach.

In the spraying and wiping methods mentioned above it may not be necessary to spray or wipe the whole surface area of the sulphur concrete. It may be sufficient to spray or wipe part of the surface area of the sulphur concrete in order to reduce the odour of the sulphur concrete. For example, if the sulphur concrete is in the form of tiles or slabs, it may not be necessary to spray or wipe all the faces of the tiles or slabs. It may be sufficient, for example, to spray or wipe only the faces of the tiles or slabs that consumers come into contact with.

Another suitable method of bringing the sulphur concrete into contact with the bleaching agent is to submerge the sulphur concrete in an aqueous solution of bleaching agent, preferably for a time period in the range of from 0.5 hour to 48 hours, more preferably in the range of from 0.5 hour to 24 hours, even more preferably in the range of from 0.5 hours to 12 hours.

In the case of sulphur concrete, it is preferred that the aqueous solution of bleaching agent comprises from 0.01% to 20%, more preferably from 0.05% to 10%, even more preferably from 0.1% to 6% by weight of bleaching agent, relative to the weight of the aqueous solution.

The sulphur concrete can be contacted with the bleaching agent at any point after the sulphur concrete has been moulded and solidified. Hence according to another aspect of the present invention there is provided a process for making a shaped sulphur concrete article comprising (a) admixing sulphur cement and aggregate at a temperature at which sulphur is liquid to form a molten sulphur concrete product (b) forming the molten sulphur concrete product into a shaped sulphur concrete article; (c) solidifying the shaped sulphur concrete article; and (d) bringing the shaped sulphur concrete article into contact with a bleaching agent.

Preferably, step (c) comprises a solidifying stage wherein the shaped sulphur concrete article is allowed to solidify, preferably at ambient temperature, for a period in the range of from 1 hour to 28 days, preferably in the range of from 1 hour to 2 days, more preferably in the range of from 1 hour to 24 hours.

Preferably the sulphur concrete article is contacted with the aqueous solution of bleaching agent once the sulphur concrete has solidified, but not necessarily fully set.

In a preferred embodiment herein step (d) additionally serves to cool the shaped sulphur concrete article at the same time as reducing its odour.

Preferably the sulphur concrete article is submerged in the aqueous solution of bleaching agent for a time period in the range of from 0.5 hours to 48 hours, more preferably in the range of from 0.5 hours to 24 hours, even more preferably in the range of from 0.5 hours to 12 hours, especially from 0.5 hours to 2 hours.

By carrying out the methods of the present invention, the level of sulphur-containing gases, such as $H_2S$, $SO_2$ and mercaptans such as methyl mercaptan and ethyl mercaptan, emitted from sulphur-bound products, such as modified sulphur and sulphur concrete, is reduced. Preferably the level of $H_2S$ is reduced to a level of less than 2 ppm, more preferably to a level of less than 1 ppm, even more preferably to a level of less than 0.0047 ppm (i.e. the human nose detection limit).

Hence according to another aspect of the present invention there is provided a sulphur-bound product, in particular a modified sulphur, wherein the level of $H_2S$ emitted by the sulphur-bound product such as modified sulphur is less than 2 ppm.

According to another aspect of the present invention there is provided a sulphur concrete article wherein the level of $H_2S$ emitted by the sulphur concrete article is less than 2 ppm.

Preferably the level of $SO_2$ emitted by the sulphur-bound product is less than 0.009 mg/L (i.e. the odour threshold for $SO_2$). Preferably the level of methyl mercaptan emitted by the sulphur-bound product is less than 0.041 ppm by volume. Preferably the level of ethyl mercaptan emitted by the sulphur-bound product is less than 0.0026 ppm by volume.

One way of monitoring levels of $H_2S$ being emitted by a sample of sulphur-bound product, such as modified sulphur or sulphur concrete, is by using an $H_2S$ detector. Preferably the level of $H_2S$ emitted by the sulphur-bound product, such as modified sulphur or sulphur concrete, as a result of the sulphur-bound product being contacted by a bleaching agent, is reduced such that it is undetectable by an $H_2S$ detector.

Another way of monitoring levels of sulphur-containing gases, such as $H_2S$ and $SO_2$, being emitted by a sample of sulphur-bound product, such as modified sulphur or sulphur concrete, is by using sulphur selective gas chromatography. If $H_2S$ is present then a peak can be seen on a gas chromatogram at around 1.98 min. If $SO_2$ is present then a peak can be seen on a gas chromatogram at around 2.11 min.

In a preferred embodiment, the sulphur-bound products, in particular the modified sulphur and sulphur concrete, of the present invention have no detectable $H_2S$ peak at around 1.98 min on a gas chromatogram. In another preferred embodiment, the sulphur-bound products, in particular the modified sulphur and sulphur concrete, of the present invention have an $SO_2$ peak on a gas chromatogram which is reduced in size by a factor of least 2 compared with the $SO_2$ peak of a sulphur-bound product which has not been subjected to the method of the present invention.

EXAMPLES

The invention is further illustrated by means of the following non-limiting examples.

Example 1

Preparation of Modified Sulphur

A modified sulphur was prepared as follows. An amount of elemental sulphur was weighted in a glass tube. The sulphur was melted by placing the tube in an oil bath of 140° C. An amount of 5-ethylidene-2-norbornene (10 wt % based on the weight of sulphur) was added and the fluid was stirred for 1 hour. The tube was then taken out of the oil bath and the fluid was poured in a cylindrical mould and allowed to solidify at room temperature.

Treatment with Bleaching Agent

A piece of modified sulphur concrete was cut into small pieces measuring 1-3 cm in length. Half of these pieces were submerged overnight in a 5 wt % sodium hypochlorite solution and then dried at room temperature for 4 hours. At the end of this time, the treated samples were placed in a glass bottle.

The untreated samples were also placed in a glass bottle. The treated samples smelled significantly less odorous than the untreated samples.

Gas Chromatography

The treated and the untreated samples of modified sulphur were then subjected to gas chromatography in order to detect the gases being emitted by the samples. The treated samples were dissolved in toluene at 140° C. for 30 minutes. The solution was cooled down and injected on a gas chromatograph. The untreated samples were also dissolved in toluene at 140° C. for 30 minutes followed by cooling of the solutions and injection on a gas chromatograph. Detection of components is done by mass spectrometry. The following GC parameters were used:

Column: DBVRX 60 m×0.32 μm×1.8 μm
40° C. to 140° C. rate 5 deg/min; to 300° C. rate 10 deg/min The untreated samples displayed peaks on the gas chromatogram at 1.98 min and 2.11 min, indicating the presence of $H_2S$ and $SO_2$ respectively. The gas chromatogram of the treated samples did not have a detectable peak at 1.98 min indicating a non detectable level of $H_2S$ (<2 ppm) emitted by these samples. The treated samples also showed a peak at 2.11 min which was reduced in size by a factor of about 2 compared with that of the untreated sample, indicating that the levels of $SO_2$ emitted by the treated samples were reduced by a factor of about 2 compared to the untreated samples.

The treated and untreated samples were also subjected to a $H_2S$ detector. The $H_2S$ detector could only detect $H_2S$ from the untreated samples. The $H_2S$ detector could not detect $H_2S$ from the treated samples indicating that the level of $H_2S$ emitted from the treated samples is less than about 1 ppm.

Examples 2 to 15

Samples of waxed and unwaxed sulphur mortar were prepared having the formulations shown in Table 1 below.

TABLE 1

| Component | Waxed sulphur mortar (wt %) | Unwaxed sulphur mortar (wt %) |
| --- | --- | --- |
| Elemental Sulphur | 24.65 | 24.98 |
| Quartz[1] | 27.65 | 27.98 |
| Sand[2] | 46.65 | 46.98 |
| Sulphur modifier[3] | 0.06 | 0.06 |
| Wax[4] | 0.99 | 0 |

[1]Average particle size is 45 μm
[2]Average particle size is 2-4 mm
[3]bis(triethoxysilylpropyl) tetrasulphide (TESPT)
[4]A Fischer-Tropsch derived paraffinic wax The samples were prepared using techniques well known in the art (for example as described in US2007/0186823) which involves admixing the components at a temperature at which sulphur is molten to prepare a homogeneous mixture. To prepare cast samples, moulds are heated to 150° C. and the formulations cast into the moulds. The moulds are left to cool in air for about 1-2 hours. Then the samples are removed from the moulds.

12 sulphur mortar samples (Examples 4-14; 6 waxed, 6 unwaxed) were soaked in a hydrogen peroxide solution having a pH of 10 at three concentrations (0.1 wt %, 0.3 wt % and 0.5 wt %) and 2 sulphur mortar samples (Comparative Examples 2 and 3) were soaked in a sodium hydroxide solution for 24 hours. The pH of all solutions was adjusted to approximately pH 10 using sodium hydroxide (measured using indicator paper). After either 1 hour or 24 hours, as indicated in Table 2 below, the sulphur mortar samples were removed from the washing liquor. The washing liquor was analysed for level of component sulphur by ion chromatography using an ICS 2000 Ion Chromatograph from Dionex. This involves injecting a small volume of the solution into a metal column lined with a resin bead coated with hydrophilic material. The injection of known volume is made into a variable strength aqueous alkaline carrier which flows through the column, this together with the column polarity ensuring separation of the various anions. The area of the anion of interest is measured and compared with a calibration standard containing an accurately known concentration of the ion of interest. The results are shown in Table 2 below.

TABLE 2

| Example | Wax content (wt %) | $H_2O_2$ concentration (%) | Washing Time (Hours) | Concentration of sulphur in washing liquor (mg/Kg) |
| --- | --- | --- | --- | --- |
| 2* | 0 | — | 24 | <0.1 |
| 3* | 1 | — | 24 | 0.1 |
| 4 | 0 | 0.1 | 1 | 0.6 |
| 5 | 0 | 0.1 | 24 | 2.0 |
| 6 | 1 | 0.1 | 1 | 0.2 |
| 7 | 1 | 0.1 | 24 | 1.1 |
| 8 | 0 | 0.3 | 1 | 0.6 |
| 9 | 0 | 0.3 | 24 | 2.2 |
| 10 | 1 | 0.3 | 1 | 0.6 |
| 11 | 1 | 0.3 | 24 | 1.3 |
| 12 | 0 | 0.5 | 1 | 0.6 |
| 13 | 0 | 0.5 | 24 | 3.2 |
| 14 | 1 | 0.5 | 1 | 0.8 |
| 15 | 1 | 0.5 | 24 | 1.4 |

*Comparative Examples

DISCUSSION

The washing liquor from the samples soaked in hydrogen peroxide solution contained higher concentrations of sulphur than the washing liquor from the untreated samples demonstrating that hydrogen peroxide solution is successful in removing sulphur compounds from the surface of the sulphur mortar and hence reducing odour.

The washing liquor from the waxed samples contained less sulphur than the washing liquor from the comparable unwaxed samples.

What is claimed is:

1. A method of reducing the odour of sulphur concrete, wherein said method comprises contacting the sulphur concrete with a bleaching agent by wiping the sulphur concrete with a cloth soaked in an aqueous solution consisting essentially of said bleaching agent and water, and wherein the odour in the sulphur concrete is caused by $H_2S$ and the $H_2S$ level of the sulphur concrete after contact with said aqueous solution of bleaching agent is less than 2 ppm.

2. A method according to claim 1 wherein the bleaching agent is selected from the group consisting of sodium hypochlorite, hydrogen peroxide and mixtures thereof.

3. A method of reducing the odour of sulphur concrete, wherein said method comprises contacting the sulphur concrete with a bleaching agent by spraying the sulphur concrete with an aqueous solution consisting essentially of said bleaching agent and water, and wherein the odour in the sulphur concrete is caused by $H_2S$ and the $H_2S$ level of the sulphur concrete after contact with said aqueous solution of bleaching agent is less than 2 ppm.

4. A method of reducing the odour of sulphur concrete, wherein said method comprises contacting the sulphur with a bleaching agent by submerging the sulphur concrete in an aqueous solution consisting essentially of said bleaching agent and water, and wherein the sulphur concrete is contacted with said bleaching agent once the sulphur concrete has solidified, but has not fully set.

5. A method according to claim 3, wherein the aqueous solution of the bleaching agent comprises from 1% to 10% by weight of the bleaching agent.

6. A method according to claim 1, wherein the sulphur concrete comprises modified sulphur as a binder and the modified sulphur is prepared by admixing molten sulphur with one or more olefinic sulphur modifiers.

7. A method according to claim 6, wherein the one or more olefinic sulphur modifiers is selected from the group consisting of 5-ethylidene-2-norbornene, 5-vinyl-2-norbornene and styrene and mixtures thereof.

8. A method according to claim 2, wherein the aqueous solution of the bleaching agent comprises from 1% to 10% by weight of the bleaching agent.

9. A method according to claim 8, wherein the sulphur concrete comprises modified sulphur as a binder and the modified sulphur is prepared by admixing molten sulphur with one or more olefinic sulphur modifiers.

10. A method according to claim 9, wherein the one or more olefinic sulphur modifiers is selected from the group consisting of 5-ethylidene-2-norbornene, 5-vinyl-2-norbornene and styrene and mixtures thereof.

11. A method according to claim 5, wherein the sulphur concrete comprises modified sulphur as a binder and the modified sulphur is prepared by admixing molten sulphur with one or more olefinic sulphur modifiers.

12. A method according to claim 11, wherein the one or more olefinic sulphur modifiers is selected from the group consisting of 5-ethylidene-2-norbornene, 5-vinyl-2-norbornene and styrene and mixtures thereof.

13. A method according to claim 4, wherein the aqueous solution of the bleaching agent comprises from 1% to 10% by weight of the bleaching agent.

14. A method according to claim 13, wherein the sulphur concrete comprises modified sulphur as a binder and the modified sulphur is prepared by admixing molten sulphur with one or more olefinic sulphur modifiers.

15. A method according to claim 14, wherein the one or more olefinic sulphur modifiers is selected from the group consisting of 5-ethylidene-2-norbornene, 5-vinyl-2-norbornene and styrene and mixtures thereof.

16. A method according to claim 1, wherein the $H_2S$ level of the sulphur concrete after contact with said aqueous solution of bleaching agent is less than 1 ppm.

17. A method according to claim 4, wherein the bleaching agent is sodium hypochlorite.

18. A method according to claim 17, wherein the sulphur concrete is submerged in said aqueous solution for a time period in the range from 0.5 to 24 hours.

* * * * *